US009825718B2

(12) United States Patent
Hutchings

(10) Patent No.: US 9,825,718 B2
(45) Date of Patent: *Nov. 21, 2017

(54) LOCALIZATION OF A MOBILE DEVICE USING RADIO SIGNAL PARAMETERS

(71) Applicant: Harman International Industries, Inc., Stamford, CT (US)

(72) Inventor: Jeffrey L. Hutchings, Lehi, UT (US)

(73) Assignee: Harman International Industries, Incorporated, Stamford, CT (US)

(*) Notice: Subject to any disclaimer, the term of this patent is extended or adjusted under 35 U.S.C. 154(b) by 106 days.

This patent is subject to a terminal disclaimer.

(21) Appl. No.: 14/587,172

(22) Filed: Dec. 31, 2014

(65) Prior Publication Data

US 2015/0195051 A1    Jul. 9, 2015

Related U.S. Application Data

(60) Provisional application No. 61/923,936, filed on Jan. 6, 2014.

(51) Int. Cl.
*H04S 7/00* (2006.01)
*G01S 11/06* (2006.01)
(Continued)

(52) U.S. Cl.
CPC ............ *H04B 17/27* (2015.01); *G01S 5/0257* (2013.01); *G01S 11/06* (2013.01); *G01S 13/765* (2013.01);
(Continued)

(58) Field of Classification Search
CPC .. H04B 17/24; H04B 17/27; H04R 2205/024; H04R 2460/07
See application file for complete search history.

(56) References Cited

U.S. PATENT DOCUMENTS

2011/0163917 A1* 7/2011 Lundgren ............... G01S 11/06
342/463
2013/0260782 A1   10/2013 Un et al.
(Continued)

FOREIGN PATENT DOCUMENTS

EP           2538237 A1    12/2012

OTHER PUBLICATIONS

Hossain, et al., A Comprehensive Study of Bluetooth Signal Parameters for Localization, The 18th Annual IEEE International Symposium on Personal, Indoor and Mobile Radio Communications (PIMRC'07), 2007 IEEE.
(Continued)

*Primary Examiner* — Lewis West
(74) *Attorney, Agent, or Firm* — Brooks Kushman P.C.

(57) ABSTRACT

A system for mobile device localization is provided with a primary device. The primary device is configured to transmit a first signal at a first transmission power level to a secondary device and to receive a response signal that is indicative of a signal strength indicator of the first signal as received by the secondary device. The primary device is further configured to determine a second transmission power level based on the signal strength indicator; transmit a second signal at the second transmission power level to the secondary device; and to determine a distance between the primary device and the secondary device based on a filtered transmission power level value.

20 Claims, 4 Drawing Sheets

(51) Int. Cl.
*G01S 13/76* (2006.01)
*G01S 5/02* (2010.01)
*H04B 17/27* (2015.01)
*H04B 17/24* (2015.01)

(52) U.S. Cl.
CPC ....... *H04B 17/24* (2015.01); *H04R 2205/024* (2013.01); *H04R 2420/07* (2013.01); *H04R 2460/07* (2013.01); *H04S 7/302* (2013.01)

(56) References Cited

U.S. PATENT DOCUMENTS

| | | | |
|---|---|---|---|
| 2014/0139375 A1* | 5/2014 | Faragher | G01S 5/0294 342/451 |
| 2014/0273859 A1* | 9/2014 | Luna | H04W 4/008 455/41.3 |
| 2015/0031387 A1* | 1/2015 | Mansour | G01S 5/0215 455/456.1 |

OTHER PUBLICATIONS

European Patent Office, European Search Report and Opinion for EP15150080.8, dated May 15, 2015, 8 pages.

* cited by examiner

LOCALIZATION OF A MOBILE DEVICE USING RADIO SIGNAL PARAMETERS

CROSS-REFERENCE TO RELATED APPLICATIONS

This application claims the benefit of U.S. provisional application Ser. No. 61/923,936 filed Jan. 6, 2014, the disclosure of which is hereby incorporated in its entirety by reference herein.

TECHNICAL FIELD

One or more embodiments relate to a system and method for determining a distance between two wireless devices based on radio signal parameters.

BACKGROUND

Mobile devices are often configured to exchange data wirelessly with other nearby media devices. For example, a cellphone may be wirelessly connected to an earpiece, and a laptop computer may be wirelessly connected to a printer. Additionally, a cellphone or tablet may be wirelessly connected to a loudspeaker for streaming music. For example, the OnBeat Xtreme™ loudspeaker docking station by JBL is an example of such a loudspeaker that may be wirelessly connected to a mobile device. Communication between wireless devices within an indoor network may be coordinated, especially when the network includes more than one of the same type of device (e.g., two or more wireless loudspeakers). Such coordination would be assisted by an accurate determination of the location of the mobile device relative to the media devices.

There are a number of different existing methods for determining the location of a mobile device using wireless signals. For example, many mobile devices (e.g., cellphones, tablet computers) are configured to use global positioning technology (GPS) for determining their location. However, GPS technology does not work well indoors without additional infrastructure, such as ground relay stations.

Other locating methods that are based on the concepts of triangulation or trilateration are also known. However, such methods often require communication between more than two devices, and/or fixed spacing between the devices.

Wireless devices are often configured to exchange data with other nearby wireless devices using Bluetooth or WiFi technology. Bluetooth, which is standardized as IEEE 802.15.1, is a wireless technology standard for exchanging data over short distances (using short-wavelength radio transmissions in the ISM band from 2400-2480 MHz) from fixed and mobile devices, creating personal area networks (PANs) with high levels of security. Bluetooth includes a number of signal parameters that relate to signal strength, including: Received Signal Strength Indicator, Link Quality, Received Power Level, and Transmit Power Level. Hossain et al., disclose a study of using such signals for determining the location of a wireless device, "A Comprehensive Study of Bluetooth Signal Parameters for Localization", IEEE, 2007.

SUMMARY

In one embodiment, a system for mobile device localization is provided with a primary device. The primary device is configured to transmit a first signal at a first transmission power level to a secondary device and to receive a response signal that is indicative of a signal strength indicator of the first signal as received by the secondary device. The primary device is further configured to determine a second transmission power level based on the signal strength indicator; transmit a second signal at the second transmission power level to the secondary device; and to determine a distance between the primary device and the secondary device based on a filtered transmission power level value.

In another embodiment, a method of determining a location of a mobile device is provided. A first signal is transmitted at a first transmission power level from a primary device to a secondary device. A signal strength indicator of the first signal as received by the secondary device is determined. A response signal is transmitted from the secondary device to the primary device that is indicative of the signal strength indicator. A second transmission power level is determined based on the signal strength indicator. A second signal is transmitted at the second transmission power level from the primary device to a secondary device. A distance between the primary device and the secondary device is determined based on a filtered transmission power level value.

In yet another embodiment, a system for mobile device localization is provided with a mobile device and at least one loudspeaker. The mobile device is configured to transmit a first signal at a first transmission power level. The at least one loudspeaker configured to receive the first signal and to determine a signal strength indicator of the first signal. The mobile device is further configured to determine a second transmission power level based on the signal strength indicator; transmit a second signal at the second transmission power level to the at least one loudspeaker; and determine a distance between the mobile device and the at least one loudspeaker based on a filtered transmission power level value.

BRIEF DESCRIPTION OF THE DRAWINGS

The embodiments of the present disclosure are pointed out with particularity and will be best understood by referring to the following detailed description in conjunction with the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein. In addition, any one or more of the electric devices may be configured to execute a computer-program that is embodied in a non-transitory computer readable medium that is programmed to perform any number of the functions as disclosed.

Figure 1:
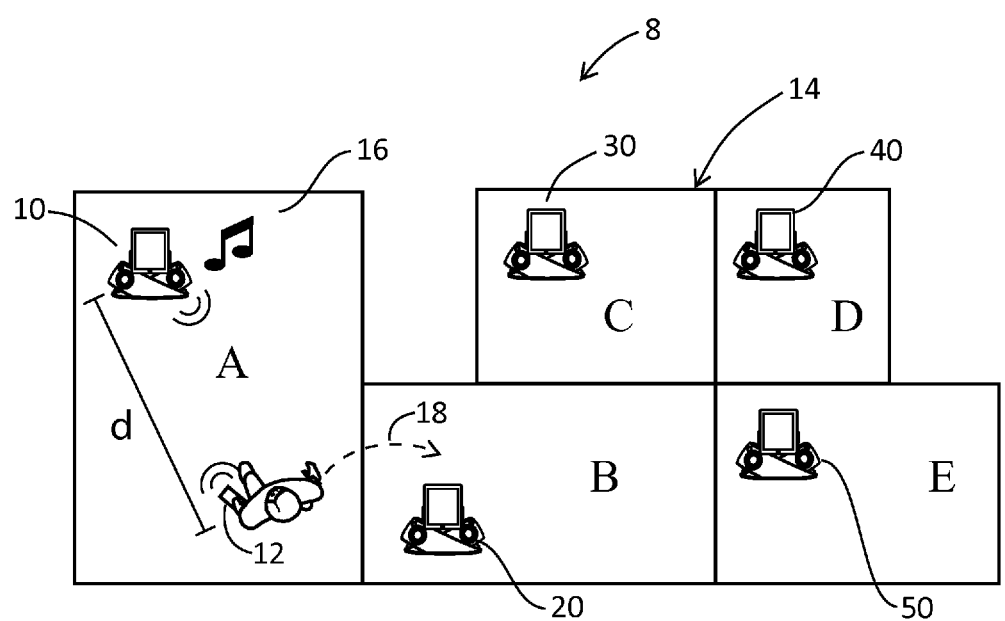
FIG. 1 is a schematic view of a building having multiple media devices that are each configured to detect the location of a mobile device according to one or more embodiments.

With reference to FIG. 1, a system for detecting the location of a mobile device is illustrated in accordance with one or more embodiments and is generally referenced by numeral 8. The system 8 includes at least one media device 10, which is a loudspeaker according to the illustrated embodiment. The loudspeaker 10 communicates with a mobile device 12 that is carried by a user. The mobile device 12 may be any portable device that stores media, such as a laptop computer, cellphone, tablet computer, etc. In one more embodiments, the media may be stored remotely (e.g., in a "cloud") and accessed by the mobile device 12. Additionally, the loudspeaker 10 may include a battery and may be operable as a mobile device. However, for clarity, the loudspeaker 10 is not referred to as a "mobile" device herein. Although described with reference to a loudspeaker 10, embodiments of the present disclosure may be applicable to other media devices, such as televisions, home theater systems, and video terminals.

FIG. 1 illustrates a user located in room A of a building 14. The user is carrying the mobile device 12 and the loudspeaker 10 is also located in room A. The user has previously established communication, or "paired" the mobile device 12 with the loudspeaker 10.

The loudspeaker 10 and the mobile device 12 communicate wirelessly with each other as depicted by the spaced apart signal lines in the illustrated embodiment. The loudspeaker 10 receives media content from the mobile device 12, and projects an audio signal 16 that corresponds to the media content. The mobile device 12 determines the distance (d) between the loudspeaker 10 and itself, and provides the distance information to the loudspeaker 10. The loudspeaker 10 may be configured to automatically activate/deactivate based on the distance.

For example, arrow 18 represents a path traveled by the user from room A to room B. Room B includes a second loudspeaker 20. The mobile device 12 may determine the distance between each loudspeaker 10, 20 and itself. The first loudspeaker 10 may be configured to deactivate, or stop playing the audio signal 16 when the mobile device 12 leaves room A, based on the distance determination. Additionally, the second loudspeaker 20 may be configured to automatically begin playing audio when the mobile device 12 enters room B, based on the distance determination. The illustrated embodiment depicts the building 14 as having a plurality of rooms (A, B, C, D, E), where each room includes a loudspeaker (10, 20, 30, 40, 50). The loudspeakers 10, 20, 30, 40, 50 may be configured for various operability (e.g., to activate/deactivate) based on relative distance between the mobile device 12 and the corresponding loudspeaker.

Figure 2:
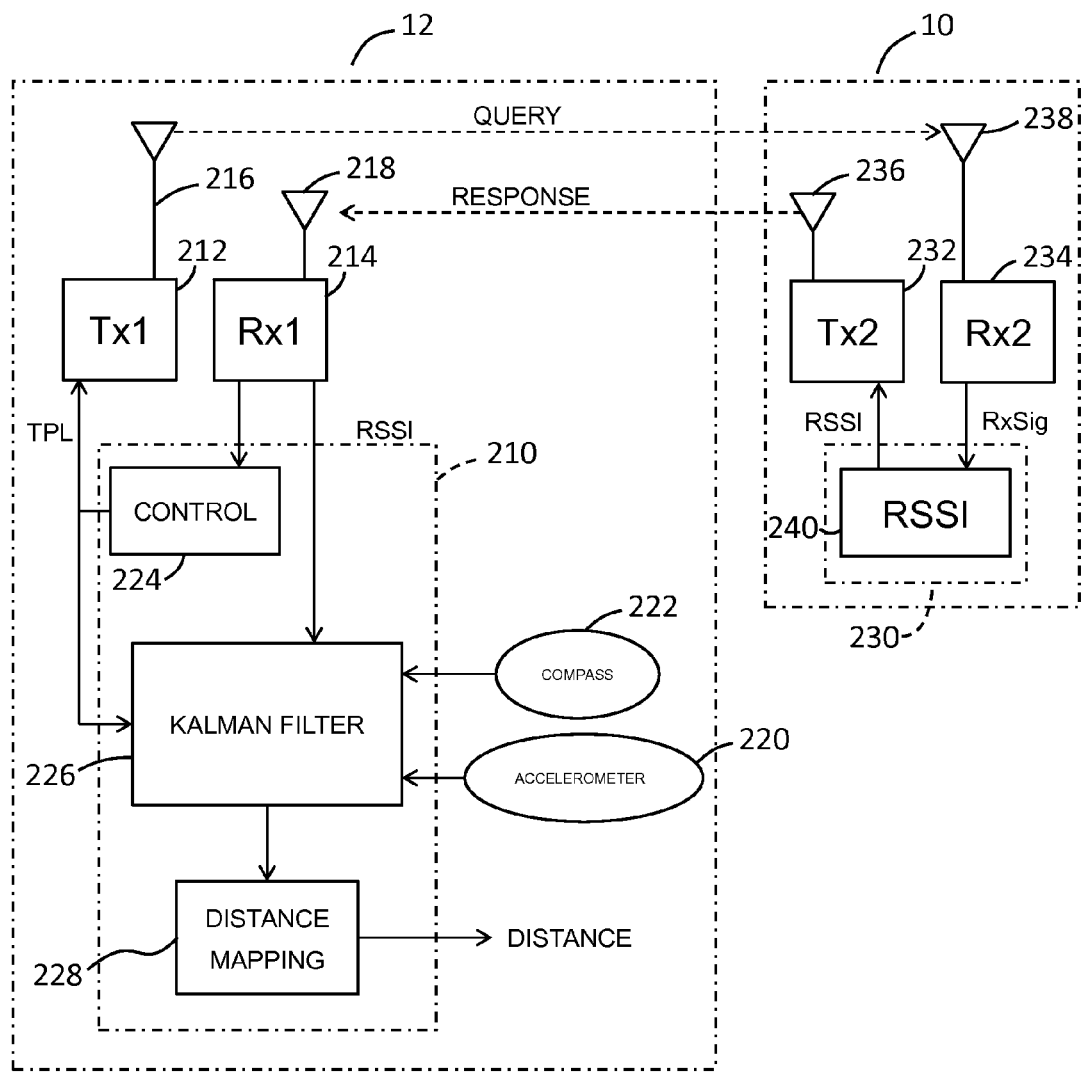
FIG. 2 is a detailed schematic view of the mobile device and one of the media devices of FIG. 1, according to one embodiment.

FIG. 2 depicts a detailed schematic view of the loudspeaker 10 and the mobile device 12 in accordance with one or more embodiments. The mobile device 12 includes a microcontroller 210, a transmitter 212 and a receiver 214. Each of the transmitter 212 and the receiver 214 includes at least one antenna 216, 218, respectively. In other embodiments, the transmitter 212 and the receiver 214 may be combined into a transmitter/receiver ("transceiver") with a common antenna (not shown). The microcontroller 210 is operably coupled to the transmitter 212 and the receiver 214 for transmitting and receiving signals to/from the loudspeaker 10.

The mobile device 12 includes an accelerometer 220 and a compass 222 according to one or more embodiments. The accelerometer 220 is configured to provide data (Ax, Ay, and Az) that is indicative of an acceleration of the mobile device 12 in three axes (x, y, z). The compass 222 is configured to provide data (DIR) that is indicative of a current orientation or direction of the mobile device 12 relative to the North Pole. In other embodiments, the mobile device 12 includes a gyroscope (not shown) for providing additional orientation information. The microcontroller 210 also includes a control module 224, a filter 226 and a distance module 228 for processing the radio signal parameters, which are disclosed in detail below.

The loudspeaker 10 also includes a microcontroller 230, a transmitter 232 and a receiver 234. Each of the transmitter 232 and the receiver 234 include at least one antenna 236, 238, respectively. In other embodiments, the transmitter 232 and the receiver 234 may be combined into a transmitter/receiver ("transceiver") with a common antenna (not shown). The microcontroller 230 is operably coupled to the transmitter 232 and the receiver 234 for transmitting and receiving signals to/from the mobile device 12. The microcontroller 230 includes a module 240 for processing the radio signal parameters, which is described in greater detail below.

Figure 3:
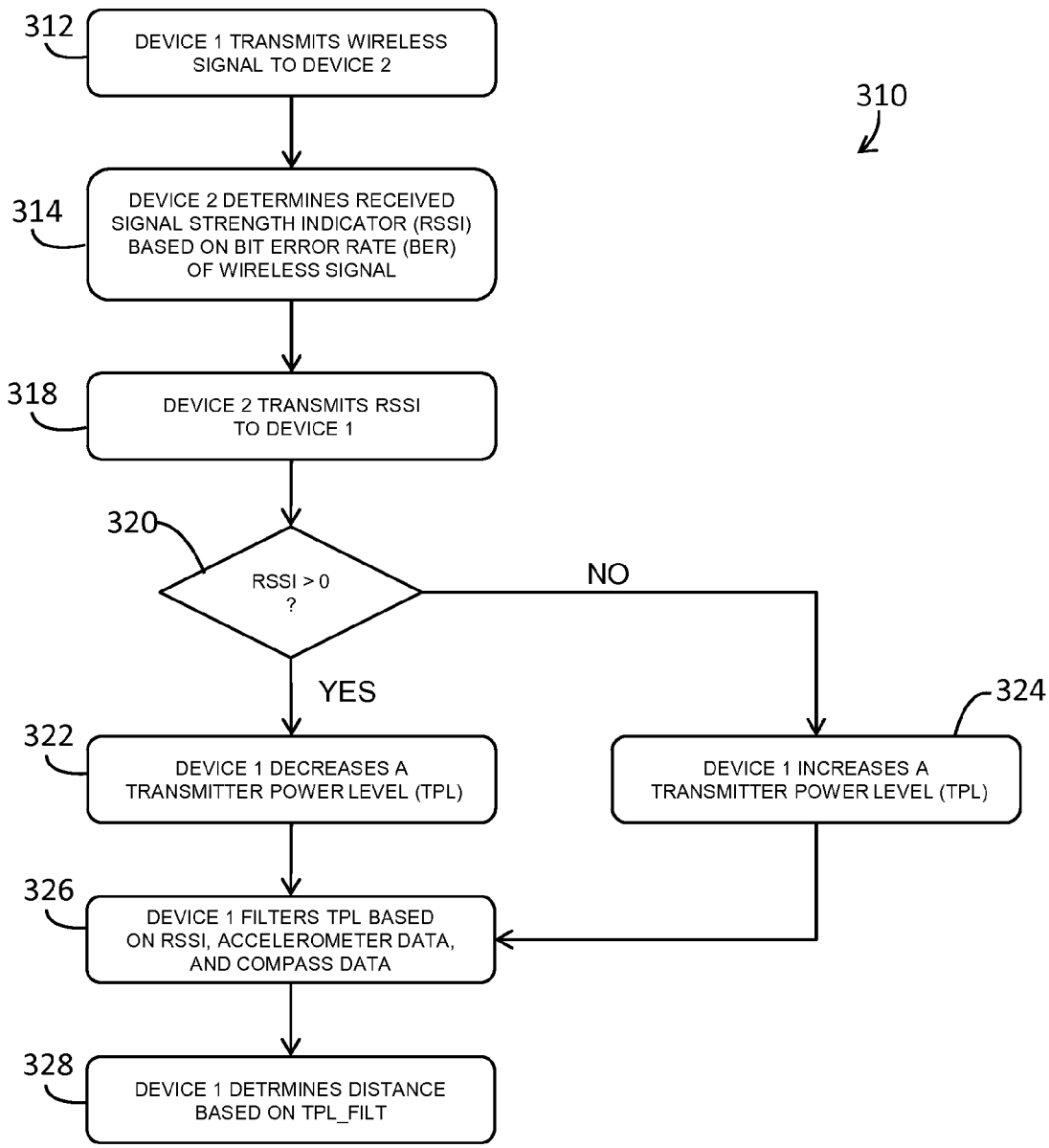
FIG. 3 is a flow chart illustrating a method for determining the location of the mobile device, according to one or more embodiments.

With reference to FIG. 3, a method for determining a location of the mobile device 12 relative to the loudspeaker 10 is illustrated in accordance with one or more embodiments and is generally referenced by numeral 310. The method 310 is implemented using software code contained within the microcontrollers 210, 230 according to one or more embodiments. While the flowchart is illustrated with a number of sequential steps, one or more steps may be omitted and/or executed in another manner without deviating from the scope and contemplation of the present disclosure.

At block 312, a primary device (e.g., the mobile device 12) transmits a wireless signal to a secondary device (e.g., the loudspeaker 10). The mobile device 12 may be configured to transmit continuously, or in response to a wake-up signal. As illustrated in FIG. 2, the microcontroller 210 of the mobile device 12 may control the transmitter 212 and antenna 216 to transmit a wireless signal, such as a query message (QUERY) to the loudspeaker 10. The query message may be formatted according to Bluetooth protocol, and include a non-data portion and a data portion. The data portion includes digital data, such as encryption data, information requests, commands and signal parameter information. The antenna 238 of the loudspeaker 10 receives the query message. The receiver 234 decodes the query message and provides a corresponding received signal (RxSig) to the microcontroller 230.

The microcontroller 230 includes the module 240, which is configured as a received signal strength indicator (RSSI) module 240 for analyzing RxSig, according to one or more embodiments. The RSSI module 240 may analyze a bit error rate (BER) of RxSig. In digital transmission, the number of bit errors is the number of received bits of a data stream over a communication channel that has been altered due to noise, interference, distortion or bit synchronization errors. The BER is the number of bit errors divided by the total number of transferred bits during a studied time interval.

Figure 4:
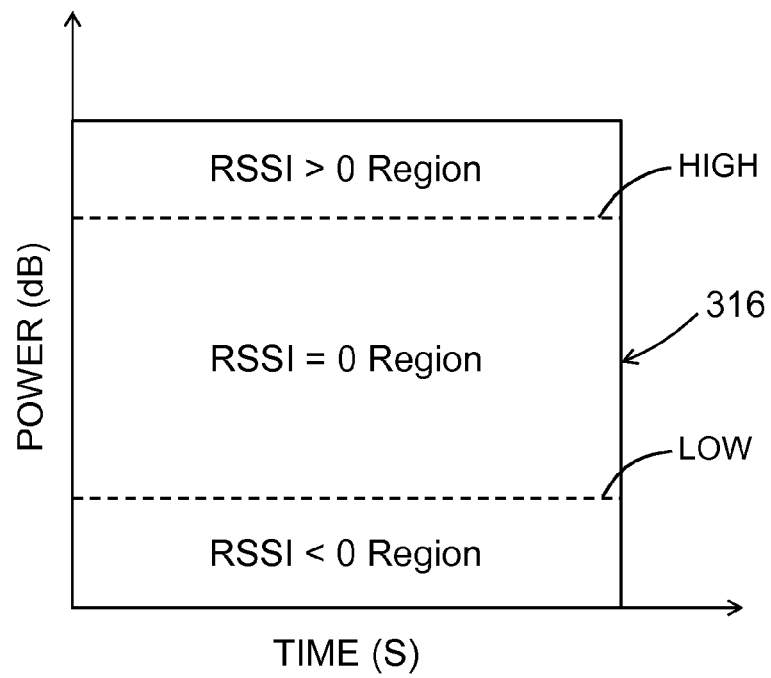
FIG. 4 is a graph illustrating a predetermined received signal strength indicator region.

At block 314, the RSSI module 240 continuously updates the BER of the RxSig, and generates a received signal strength indicator (RSSI) based on the BER. The RSSI is an 8-bit signed integer, where the sign (+, 0, −) indicates whether the received power level of the wireless signal is above, within, or below a predetermined range. With reference to FIG. 4, the predetermined RSSI range is illustrated in accordance with one or more embodiments and is generally referenced by numeral 316. The predetermined RSSI range 316 represents a preferred power range for the RxSig, and is bounded by an upper threshold value (HIGH), and a lower threshold value (LOW). The RSSI module 240 determines a value for RSSI based on a comparison of RxSig to the threshold values. For example, if the RxSig is above the upper threshold value (HIGH), then the RSSI module 240 assigns a positive (+) value to RSSI. If the RxSig is below the lower threshold value (LOW), then the RSSI module 240 assigns a negative (−) value to RSSI. If RxSig is between HIGH and LOW, then the RSSI module 240 assigns a zero (0) value to RSSI. The threshold values are relative values that are device specific. However the difference between the threshold values is approximately 20 dB, according to one or more embodiments. For example, in one embodiment HIGH is equal to 30 dB, and LOW is equal to 10 dB; and in another embodiment HIGH is equal to 45 dB, and LOW is equal to 25 dB.

At block 318, the microcontroller 230 of the loudspeaker 10 controls the transmitter 232 and antenna 236 to transmit a response message (RESPONSE) to the mobile device 12 that includes a data portion. The data portion includes digital data, such as encryption data, responses to the information requests, commands and signal parameter information such as the RSSI. The receiver 214 receives and decodes the response message, and then provides information, such as the RSSI, to the microcontroller 210.

The microcontroller 210 includes the control module 224 for controlling the transmission power level (TPL). TPL is a Bluetooth signal parameter that is controlled for facilitating energy conservation and to compensate for interference. The control module 224 adjusts the TPL based on the RSSI. In general, if the TPL is held constant, then as the distance between the loudspeaker 10 and the mobile device 12 increases, the RSSI will decrease as the RxSig strength degrades due to free space losses, or other losses. However, RSSI alone does not directly correlate to distance, because RSSI is also subject to other losses, and the determination of RSSI.

At operation 320, the control module 224 of the mobile device 12 evaluates the RSSI to determine if RSSI is greater than the power levels associated with the predetermined range (0 region). If the determination at operation 320 is YES (e.g., RSSI>0), then the control module 224 proceeds to block 322 and decreases TPL. However, if the determination at operation 320 is NO, which indicates that RSSI is either within the predetermined range (e.g., RSSI=0), or RSSI is below the predetermined range (e.g., RSSI<0), then the control module 224 proceeds to block 324 and increases TPL. In effect, the control module 224 controls the RSSI such that it oscillates about one of the threshold values (e.g., HIGH or LOW).

Figure 5:
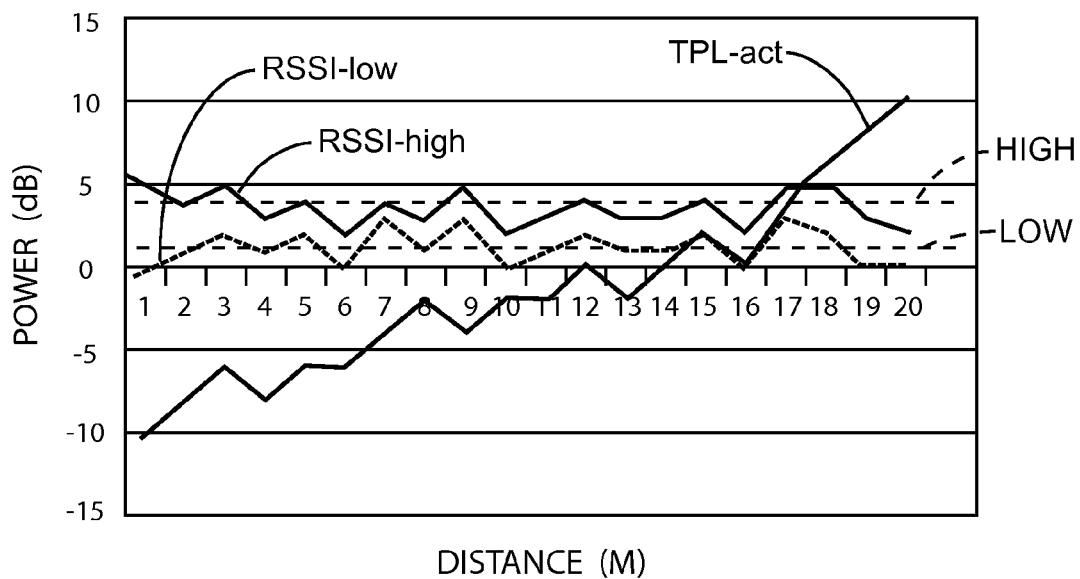
FIG. 5 is a graph illustrating radio signal parameters that are determined by the method of FIG. 3.

FIG. 5 depicts a graph of TPL and RSSI over distance as generated by blocks 322 and 324. The graph includes an actual TPL curve (TPL_act) which reflects the actual behavior of TPL with respect to distance. As depicted in FIG. 5, an overall trend of the TPL_act curve increases with distance within the TPL range (e.g., +/−20 dbM). By using the RSSI as feedback, the RSSI is maintained at a generally constant value as distance changes.

In one embodiment, the control module 224 maintains the RSSI at a generally constant value corresponding to the HIGH threshold, which is depicted by curve (RSSI_high). As illustrated by RSSI_high and TPL_act, the control module 224 decreases TPL when RSSI_high is above the HIGH threshold, and increases TPL when RSSI_high is equal to or below the HIGH threshold. In another embodiment, the control module 224 maintains the RSSI at a generally constant value corresponding to the LOW threshold, which is depicted by curve (RSSI_low). As illustrated by RSSI_low and TPL_act, the control module 224 decreases TPL when RSSI_low is above the LOW threshold, and increases TPL when RSSI_low is equal to or below the LOW threshold.

The microcontroller 210 also includes the filter 226, and the distance module 228. The filter 226 is an extended Kalman filter (EKF) according to one or more embodiments. An EKF is a predictive filter that operates recursively to constantly update a predictive state model.

At block 326, the filter 226 determines a filtered TPL (TPL_filt). The filter 226 receives input including the TPL, the DIR data and the Ax, Ay, Az data; and estimates TPL_filt based on the input. In general, stronger TPL readings will correlate to distance and orientation. Therefore if TPL readings are correlated to both DIR and Ax, Ay, Az over time, then a more accurate TPL_filt signal may be determined. The goal of the EKF is to recursively fit curve TPL_act to more closely match a theoretical TPL model (not shown) that increases linearly with distance. Therefore, over time, the TPL_filt data will match more closely to the theoretical TPL model and provide a more linear, monotonic representation of TPL verses distance.

At block 328, the distance module 228 receives TPL_filt, and determines a distance between the mobile device 12 and the loudspeaker 10. The distance module 228 includes predetermined data and maps TPL_filt to a distance value.

Although the illustrated embodiments depict the mobile device 12 as being the primary device for determining the distance between the wireless devices 10, 12; other embodiments envision the loudspeaker 10 as the primary device and the mobile device 12 as the secondary device. Thus, in one or more embodiments, the loudspeaker 10 and the mobile device 12 collectively provide a system and method of determining the location of the mobile device 12. A query message, including data, is transmitted from a primary device to a secondary device. The query message is received, and a received signal strength indicator of the data is determined. A response message is transmitted to the primary device that is indicative of the signal strength indicator. A power level of a transmitter of the primary device is controlled, based on the signal strength indicator. A filtered power level value is generated, based on the signal strength indicator and at least one of accelerometer data and compass data. Then a distance between the primary device and the secondary device is determined, based on the filtered power level value. Alternatively, in other embodiments, both the loudspeaker 10 and the mobile device 12 are configured to determine distance using symmetrical processes, and then the two distance determinations are correlated for greater accuracy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for mobile device localization comprising:
    a primary device configured to:
        transmit a first signal at a first transmission power level to a secondary device;
        receive a response signal that is indicative of a signal strength indicator of the first signal as received by the secondary device;
        adjust the first transmission power level to a second transmission power level based on the signal strength indicator;
        transmit a second signal at the second transmission power level to the secondary device; and
        determine a distance between the primary device and the secondary device based on a filtered transmission power level value, wherein the filtered transmission power level value is based on the second transmission power level value.

2. The system of claim 1 wherein the second transmission power level is greater than the first transmission power level in response to the signal strength indicator being less than or equal to a predetermined threshold value.

3. The system of claim 1 wherein the primary device further comprises at least one of an accelerometer and a compass.

4. The system of claim 3 wherein the primary device is further configured to generate the filtered transmission power level value based on the signal strength indicator and at least one of accelerometer data and compass data.

5. The system of claim 1 wherein the primary device further comprises an extended Kalman filter for filtering the first transmission power level.

6. The system of claim 1 wherein the primary device comprises one of a cellphone and a computer and the secondary device comprises a loudspeaker.

7. The system of claim 1 wherein the primary device comprises a loudspeaker and the secondary device comprises one of a cellphone and a computer.

8. The system of claim 1 wherein the primary device and the secondary device are configured to communicate with each other using a short range protocol.

9. A method of determining a location of a mobile device, the method comprising:
    transmitting a first signal at a first transmission power level from a primary device to a secondary device;
    determining a signal strength indicator of the first signal as received by the secondary device;
    transmitting a response signal from the secondary device to the primary device that is indicative of the signal strength indicator;
    determining a second transmission power level based on the signal strength indicator;
    transmitting a second signal at the second transmission power level from the primary device to a secondary device; and
    determining a distance between the primary device and the secondary device based on a filtered transmission power level value, wherein the filtered transmission power level value is based on the second transmission power level value.

10. The method of claim 9 wherein the second transmission power level is greater than the first transmission power level in response to the signal strength indicator being less than or equal to a predetermined threshold value.

11. The method of claim 9 further comprising generating the filtered transmission power level value based on the signal strength indicator and at least one of accelerometer data and compass data.

12. The method of claim 9 further comprising filtering the first transmission power level using an extended Kalman filter.

13. A system for mobile device localization comprising:
    a mobile device configured to transmit a first signal at a first transmission power level; and
    at least one loudspeaker configured to receive the first signal and to determine a signal strength indicator of the first signal;
    wherein the mobile device is further configured to:
        determine a second transmission power level based on the signal strength indicator;
        transmit a second signal at the second transmission power level to the at least one loudspeaker; and
        determine a distance between the mobile device and the at least one loudspeaker based on a filtered transmission power level value, wherein the filtered transmission power level value is based on the second transmission power level value.

14. The system of claim 13 wherein the second transmission power level is greater than the first transmission power level in response to the signal strength indicator being less than or equal to a predetermined threshold value.

15. The system of claim 13 wherein the mobile device further comprises at least one of an accelerometer and a compass.

16. The system of claim 15 wherein the mobile device is further configured to generate the filtered transmission power level value based on the signal strength indicator and at least one of accelerometer data and compass data.

17. The system of claim 13 wherein the mobile device further comprises an extended Kalman filter for filtering the first transmission power level.

18. The system of claim 13 wherein the at least one loudspeaker comprises a first loudspeaker and a second loudspeaker.

19. The system of claim 18 wherein the mobile device is further configured to transmit media content to the first loudspeaker and the second loudspeaker.

20. The system of claim 19 wherein the first loudspeaker is further configured to playback the media content if the distance between the mobile device and the first loudspeaker is less than the distance between the mobile device and the second loudspeaker.

* * * * *